UNITED STATES PATENT OFFICE.

JOHN MASTERS AND MILES MASTERS, OF BUREAU JUNCTION, ILLINOIS.

COMPOUND MEAL OR FLOUR AND PROCESS OF MAKING THE SAME.

SPECIFICATION forming part of Letters Patent No. 286,033, dated October 2, 1883.

Application filed February 6, 1883. (No specimens.)

*To all whom it may concern:*

Be it known that we, JOHN MASTERS and MILES MASTERS, of Bureau Junction, in the county of Bureau and State of Illinois, have invented a Compound Meal or Flour and Process of Making the Same; and we do hereby declare the following to be a full, clear, and exact description of the invention, such as will enable others skilled in the art to which it pertains to make and use it.

Our invention relates to the treatment of wheat for the production of food; and it consists in a compound meal or flour made from the germs of the wheat-berry, together with the red shorts or inner coatings of the bran.

It still further consists in the process, hereinafter claimed, by which said flour is produced.

The object of our invention is to produce a very nutritious and highly valuable article of food from that portion of the wheat-berry which has been heretofore thrown off as offal, and fed only to animals, where the high grades of flour are made.

The wheat is passed through a gradual-reduction mill, so as to free the germs from the berries or grain. In doing this a small amount of low-grade flour is made and some coarse middlings. The germs and the middlings are then taken and passed between smooth crushing-rollers, so as to crush and flatten them out. The germs, being of a gummy nature or substance, are pressed with the middlings into a thin cake. The cake is then sent to a spike-mill, which breaks or pulverizes a portion of the cake-middlings and leaves it in a condition to sieve or bolt out the floury part.

A spike-mill is used because the spikes upon the revolving cylinder or cylinders break the caked material very rapidly and effectively, and disintegrate in a measure the caked floury part, so that it can be sifted out and sent to the white-flour reel, while the still flattened part passes over as material for germ-flour. Other means may be used to break this gummed part; but a mill in which a cylinder or cylinders provided with spikes are used is preferred.

The germ and that small part of the middlings which failed to get separated from the germs are tailed over. These germs and the red shorts which were made in the several reductions, together with some from the purifier and dust-room, are sent to a corrugated roll or burr, where they are lightly reground, and then passed, together with the reground bran or last reduction and the small amount of flour made in the first reduction, into a bolting-reel, where the product is bolted.

It is not absolutely necessary to finally bolt or even regrind the germ material; but it is better suited for a flour for all purposes, because the last grinding and bolting eliminates all the coarser particles.

To all of the germs obtained from a bushel of wheat we add from three to five pounds of red shorts; but the exact amount of the shorts is a matter of choice, as some prefer more than others. Of this new product we get about ten pounds to the bushel of wheat, besides our usual amount of high grades of flour. This wheat-germ and the red shorts make an excellent brown bread by themselves; but for a flour for all purposes it is best to add the low grade to them, as it makes a better loaf. This wheat-germ contains the greater portion of the oil, red shorts, and the mineral matter and phosphates which are found in the wheat-berry, and hence is a valuable article of food.

Having thus described our invention, we claim—

1. As a compound meal or flour, wheat-germs mixed with the red shorts or inner coatings of the bran, substantially as described.

2. The process herein described of producing a compound meal or flour, consisting in separating the germ of the wheat, crushing the germs and middlings by means of rollers, breaking the caked product thus produced by suitable means, bolting the broken product, mixing the crushed germs with the red shorts, then regrinding, and then bolting it to take out the coarser particles, substantially as set forth.

In testimony whereof we affix our signatures in presence of two witnesses.

JOHN MASTERS.
MILES MASTERS.

Witnesses:
GEORGE S. SKINNER,
HENRY N. KEENER.